US009426781B2

(12) United States Patent
Kim et al.

(10) Patent No.: US 9,426,781 B2
(45) Date of Patent: Aug. 23, 2016

(54) INFORMATION EXCHANGE METHOD AND APPARATUS FOR D2D COMMUNICATION

(71) Applicant: Samsung Electronics Co., Ltd., Suwon-si, Gyeonggi-do (KR)

(72) Inventors: Kyungkyu Kim, Suwon-si (KR); Daegyun Kim, Seongnam-si (KR); Seunghoon Park, Seoul (KR); Chiwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 14/097,736

(22) Filed: Dec. 5, 2013

(65) Prior Publication Data

US 2014/0162714 A1 Jun. 12, 2014

(30) Foreign Application Priority Data

Dec. 6, 2012 (KR) .......................... 10-2012-0141218

(51) Int. Cl.
*H04B 7/00* (2006.01)
*H04W 72/02* (2009.01)
*H04W 76/02* (2009.01)
*H04W 8/00* (2009.01)

(52) U.S. Cl.
CPC ............. *H04W 72/02* (2013.01); *H04W 8/005* (2013.01); *H04W 76/023* (2013.01); *Y02B 60/50* (2013.01)

(58) Field of Classification Search
CPC .. H04W 72/02; H04W 76/023; H04W 72/04
USPC .............................. 455/509, 41.1, 41.2, 41.3
See application file for complete search history.

(56) References Cited

U.S. PATENT DOCUMENTS

| 8,761,099 B2* | 6/2014 | Charbit ................. H04W 72/04 370/329 |
| 8,891,497 B1* | 11/2014 | Vleugels ......................... 370/334 |
| 9,072,083 B2* | 6/2015 | Zhang ................... H04L 5/0007 |
| 2008/0102793 A1* | 5/2008 | Ananthanarayanan H04W 12/04 455/411 |
| 2009/0016353 A1 | 1/2009 | Li et al. |
| 2009/0017797 A1* | 1/2009 | Li .......................... H04L 67/104 455/414.1 |
| 2009/0017855 A1 | 1/2009 | Kwon et al. |
| 2009/0239469 A1* | 9/2009 | Rangarajan ............. H04L 67/16 455/41.2 |
| 2010/0011110 A1* | 1/2010 | Doppler ............... H04W 76/023 709/228 |
| 2010/0260093 A1* | 10/2010 | Liu ....................... H04B 7/2606 370/315 |

(Continued)

FOREIGN PATENT DOCUMENTS

| FI | WO 2010049801 A1 * | 5/2010 | ............ H04W 72/04 |
| WO | WO 2010049801 A1 * | 5/2010 | ............ H04W 72/04 |

*Primary Examiner* — Md Talukder
(74) *Attorney, Agent, or Firm* — Jefferson IP Law, LLP

(57) ABSTRACT

A method and apparatus for exchanging information between devices for use in the pairing process for Device To Device (D2D) communication is provided. A signal transmission/reception method of a device in a mobile communication system includes determining a resource for the device to transmit a pairing signal, transmitting a discovery signal including information on the determined resource, pairing with a neighbor device that received the discovery signal through the resource indicated by the resource information, and communicating data signals with the paired neighbor device. The information exchange method and apparatus for D2D communication is capable of preventing a plurality of devices from attempting pairing on the same frequency simultaneously, thereby improving pairing efficiency and reducing power consumption of the device.

20 Claims, 9 Drawing Sheets

(56) References Cited

U.S. PATENT DOCUMENTS

| | | | | |
|---|---|---|---|---|
| 2011/0028091 A1* | 2/2011 | Higgins | ............... | H04L 63/0492 455/41.2 |
| 2011/0111788 A1* | 5/2011 | Damnjanovic | ....... | H04W 52/42 455/522 |
| 2011/0183614 A1* | 7/2011 | Tamura | ............... | H04M 1/7253 455/41.2 |
| 2011/0270984 A1 | 11/2011 | Park | | |
| 2011/0312331 A1* | 12/2011 | Hakola | ............... | H04W 72/085 455/452.2 |
| 2012/0009875 A1* | 1/2012 | Miettinen | ............ | A61B 5/0006 455/41.2 |
| 2012/0030465 A1* | 2/2012 | Bailey | ................. | H04W 12/06 713/168 |
| 2012/0093098 A1* | 4/2012 | Charbit | ................. | H04W 72/04 370/329 |
| 2012/0213183 A1 | 8/2012 | Chen et al. | | |
| 2012/0322379 A1* | 12/2012 | Eun | .................... | H04M 1/7253 455/41.2 |
| 2012/0322484 A1* | 12/2012 | Yu | .......................... | H04W 4/08 455/509 |
| 2013/0051277 A1* | 2/2013 | Hakola | ............... | H04W 76/023 370/254 |
| 2013/0070722 A1* | 3/2013 | Li | ......................... | H04L 5/0003 370/329 |
| 2013/0150058 A1* | 6/2013 | Lim | .................... | H04W 72/048 455/450 |
| 2013/0171939 A1* | 7/2013 | Tian | ......................... | H04B 7/24 455/41.2 |
| 2013/0267177 A1* | 10/2013 | Umezawa | ........... | H04L 63/0492 455/41.2 |
| 2013/0308552 A1* | 11/2013 | Madan | .................. | H04L 5/0094 370/329 |
| 2014/0036876 A1* | 2/2014 | Li | ......................... | H04W 24/04 370/336 |
| 2014/0038653 A1* | 2/2014 | Mildh | ................. | H04W 28/048 455/501 |
| 2014/0162714 A1* | 6/2014 | Kim | .................... | H04W 76/023 455/509 |
| 2014/0219095 A1* | 8/2014 | Lim | .................... | H04W 72/085 370/235 |
| 2014/0286293 A1* | 9/2014 | Jang | ..................... | H04L 5/0044 370/329 |
| 2014/0342747 A1* | 11/2014 | Lee | ....................... | H04L 5/0053 455/450 |

\* cited by examiner

INFORMATION EXCHANGE METHOD AND APPARATUS FOR D2D COMMUNICATION

CROSS-REFERENCE TO RELATED APPLICATION(S)

This application claims the benefit under 35 U.S.C. §119(a) of a Korean patent application filed on Dec. 6, 2012 in the Korean Intellectual Property Office and assigned Serial number 10-2012-0141218, the entire disclosure of which is hereby incorporated by reference

TECHNICAL FIELD

The present disclosure relates to a method and apparatus for exchanging information in Device to Device (D2D) communication. More particularly, the present disclosure relates to a method and apparatus for exchanging information between devices in a pairing process for D2D communication.

BACKGROUND

Recently, Device to Device (D2D) service for communication between devices through a direct communication link without network entity such as base station has been introduced.

A User Equipment (UE) supporting D2D service acquires synchronization with neighbor devices, performs device discovery at a preconfigured time with a preconfigured resource, and collects device information from devices found during device discovery. The device information may include device identifier, interest, application program information, and the like.

As described above, the devices supporting D2D service performs device discovery at the preconfigured time using the preconfigured resource. The device supporting D2D service platforms generates a Connection Identifier (CID) for establishing a connection with a target device. However, if a plurality of devices attempts connections simultaneously, a problem of frequency overlapping in generation of a CID may be caused.

There is therefore a need of a method for generating CID efficiently while reducing power consumption of the UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for exchanging data between devices for Device to Device (D2D) communication.

In accordance with an aspect of the present disclosure, a signal transmission/reception method of a device is provided for use in a mobile communication system. The signal transmission/reception method includes determining a resource for the device to transmit a pairing signal, transmitting a discovery signal including information on the determined resource, pairing with a neighbor device that received the discovery signal through the resource indicated by the resource information, and communicating data signals with the paired neighbor device.

In accordance with another aspect of the present disclosure, a device operating in a mobile communication system is provided. The device includes a transceiver configured to transmit and receive signals to and from a base station and a neighbor device and a controller configured to control the transceiver, to determine a resource for the device to transmit a pairing signal, to control the device to transmit a discovery signal including information on the determined resource, to perform pairing with a neighbor device that received the discovery signal through the resource indicated by the resource information, and to control the device to communicate data signals with the paired neighbor device.

In accordance with another aspect of the present disclosure, a signal transmission/reception method of a base station is provided for use in a mobile communication system. The signal transmission/reception method includes transmitting at least one of a discovery signal transmission/reception resources information and pairing signal transmission/reception resources information to a device and receiving a D2D request signal including at least one of device information, paired neighbor device information, pairing connection information, pairing resource information, and device buffer size, wherein the device determines one of the pairing signal transmission/reception resources as the resource for use in transmitting the pairing signal.

In accordance with still another aspect of the present disclosure, a base station of a mobile communication system is provided. The base station includes a transceiver configured to transmit and receive signals to and from a device and a controller configured to control the transceiver to transmit at least one of a discovery signal transmission/reception resources information and pairing signal transmission/reception resources information to a device and to receive a D2D request signal including at least one of device information, paired neighbor device information, pairing connection information, pairing resource information, and device buffer size, wherein the device determines one of the pairing signal transmission/reception resources as the resource for use in transmitting the pairing signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
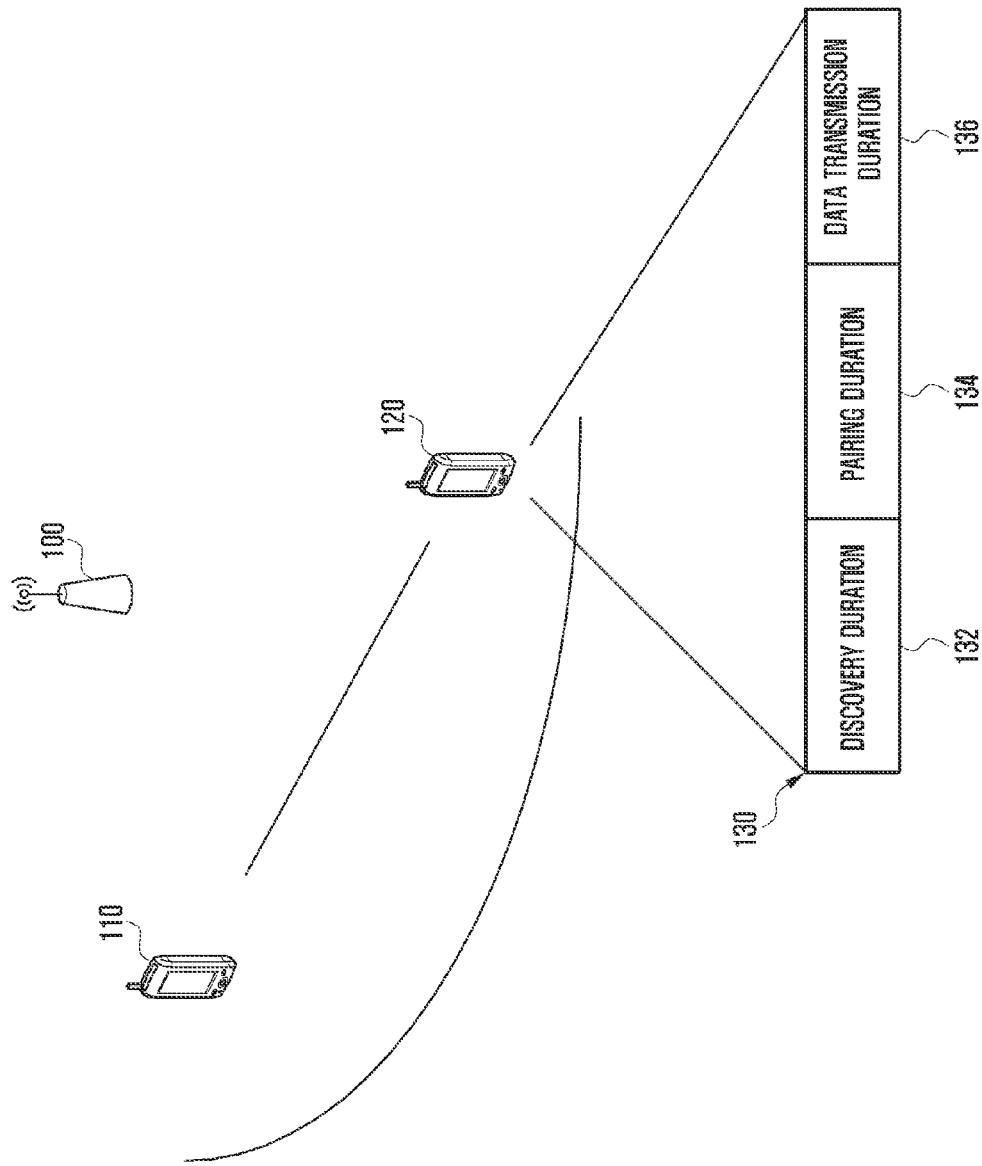
FIG. 1 is a diagram illustrating Device to Device (D2D) communication concept of frame structure according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

According to various embodiments of the present disclosure, a device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, a device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung Home-Sync™, Apple TV™, or Google TV™), a gaming console, an electronic dictionary, an electronic key, a camcorder, an electronic picture frame, and/or the like.

According to various embodiments of the present disclosure, a device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, a device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a device may be any combination of the foregoing devices. In addition, it will be apparent to one having ordinary skill in the art that an electronic device according to various embodiments of the present disclosure is not limited to the foregoing devices.

In order to accomplish the above aspect, a communication method of a transmission device in a Device to Device (D2D) communication system according to various embodiments of the present disclosure includes receiving a discovery message from a reception device, checking (e.g., determining) a Physical Resource Index (PRI) of the reception device based on the received discovery message, transmitting a Pre-Pairing Request (Pre-Pairing REQ) with the PRI of the reception device, receiving a Pre-Pairing Response (Pre-Pairing RSP) from the reception device in response to the Pre-Pairing REQ, and transmitting a pairing message corresponding to the Pre-Pairing RSP to the reception device.

According to various embodiments of the present disclosure, a transmission device of a D2D communication system includes a transceiver which receives a discovery message from a reception device and a controller which checks (e.g., determines) a PRI of the reception device based on the received discovery message, wherein the transceiver transmits a Pre-Pairing REQ with the PRI of the reception device, receives a Pre-Pairing RSP from the reception device in response to the Pre-Pairing REQ, and transmits a pairing message corresponding to the Pre-Pairing RSP to the reception device.

FIG. 1 is a diagram illustrating D2D communication concept of frame structure according to an embodiment of the present disclosure.

Referring to FIG. 1, the D2D communication may be performed among first device 110, second device 120, and base station 100. However, according to various embodiments of the present disclosure, the base station 100 is an optional entity in the D2D communication. For example, the first device 110 and the second 120 may perform the D2D communication without the base station 100.

The first device 110 and the second device 120 attempt communication without assistance of the base station 100. At this time, the frequency used for communication between the first device 110 and the second device 120 may be a part of the frequency band of the base station 100 or not.

The first device 110 and the second device 120 may perform communication through a preconfigured communication frame 130. The communication frame may include a discovery duration 132, a pairing duration 134, and a data transfer duration 136. The lengths of the durations depicted in drawing are not proportional to the corresponding time durations in the real communication and may vary depending on the configuration.

The first device 110 and the second device 120 perform discovery procedure in the discovery duration for discovering other devices. In the following description, the devices operating in the system supporting D2D service can transmit device information thereof in the time called discovery duration 132 based on the tone or sequence for discovering other devices. According to various embodiments of the present disclosure, the first device 110 and the second device 120 may transmit a signal carrying the information on the resource for receiving data in the pairing duration 134 and the data transfer duration 136 for the discovery duration 132. The signal may be broadcast in order for unspecified number of devices to receive the signal. The resource for use in receiving the signal may include the information on the frequency band for use in receiving the signal from another terminal. According to various embodiments of the present disclosure, the frequency band may be the frequency band used in Frequency Division Multiple (FDM) access mode on the frequency allocated for D2D service. According to various embodiments of the present disclosure, the frequency band may be identified by an index.

According to various embodiments of the present disclosure, device information may include device identity information, interest, application program information, and the like.

Each of the devices within a system for D2D communication transmits, when the device has data to be transmitted to one of found devices, a pairing request message to the corresponding device for pairing. According to various embodiments of the present disclosure, the pairing duration 134 may include negotiation duration and pairing message exchange duration. In the negotiation duration, the peer devices may exchange device informations to identify each other.

In the pairing duration, the devices select a Link ID of the channel to exchange data thereon. The device which has received one or more pairing request messages transmits a pairing response message to one of the devices transmitted the pairing request message to confirm the pairing process. By transmitting the pairing response message, the Link ID is determined such that the paired devices communicate data on the bandwidth indicated by the selected link ID. The detailed pairing procedure is made with reference to an example.

After selecting the Link ID in the pairing duration 134, the paired devices perform a distributed schedule procedure to acquire the resource for use in data transmission based on the selected Link ID. In the distributed scheduling procedure, the paired devices measure the interference from other pairs using pilot information based on the priority of the Link ID to check (e.g., determine) availability of simultaneous transmission. After completing the scheduling procedure, the paired devices may transmit data on the resource identified with the Link ID.

The communication procedure described with reference to FIG. 1 may be progressed in the state that all of the devices within the network are synchronized to a predetermined timing, and the timing of each process may vary.

Figure 2:
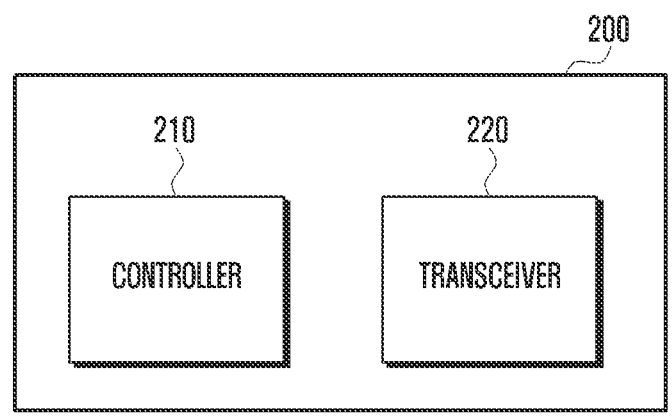
FIG. 2 is a block diagram illustrating a configuration of a device according to an embodiment of the present disclosure.

FIG. 2 is a block diagram illustrating a configuration of a device according to an embodiment of the present disclosure.

Referring to FIG. 2, device 200 includes a controller 210 and a transceiver 220. The transceiver 220 is capable of transmitting and receiving information under the control of the controller 210. The controller 210 is capable controlling overall operations of the device 200.

The controller 210 performs operation based on the information received through the transceiver 220, and transmits the operation result through the transceiver 220.

The transceiver 220 may transmit/receive information to/from another device or base station under the control of the controller 210.

According to various embodiments of the present disclosure, the controller 210 and the transceiver 220 may be the components of a mobile communication terminal.

According to various embodiments of the present disclosure, the transceiver may include a transmitter for transmitting information and a receiver for receiving information.

Figure 3:
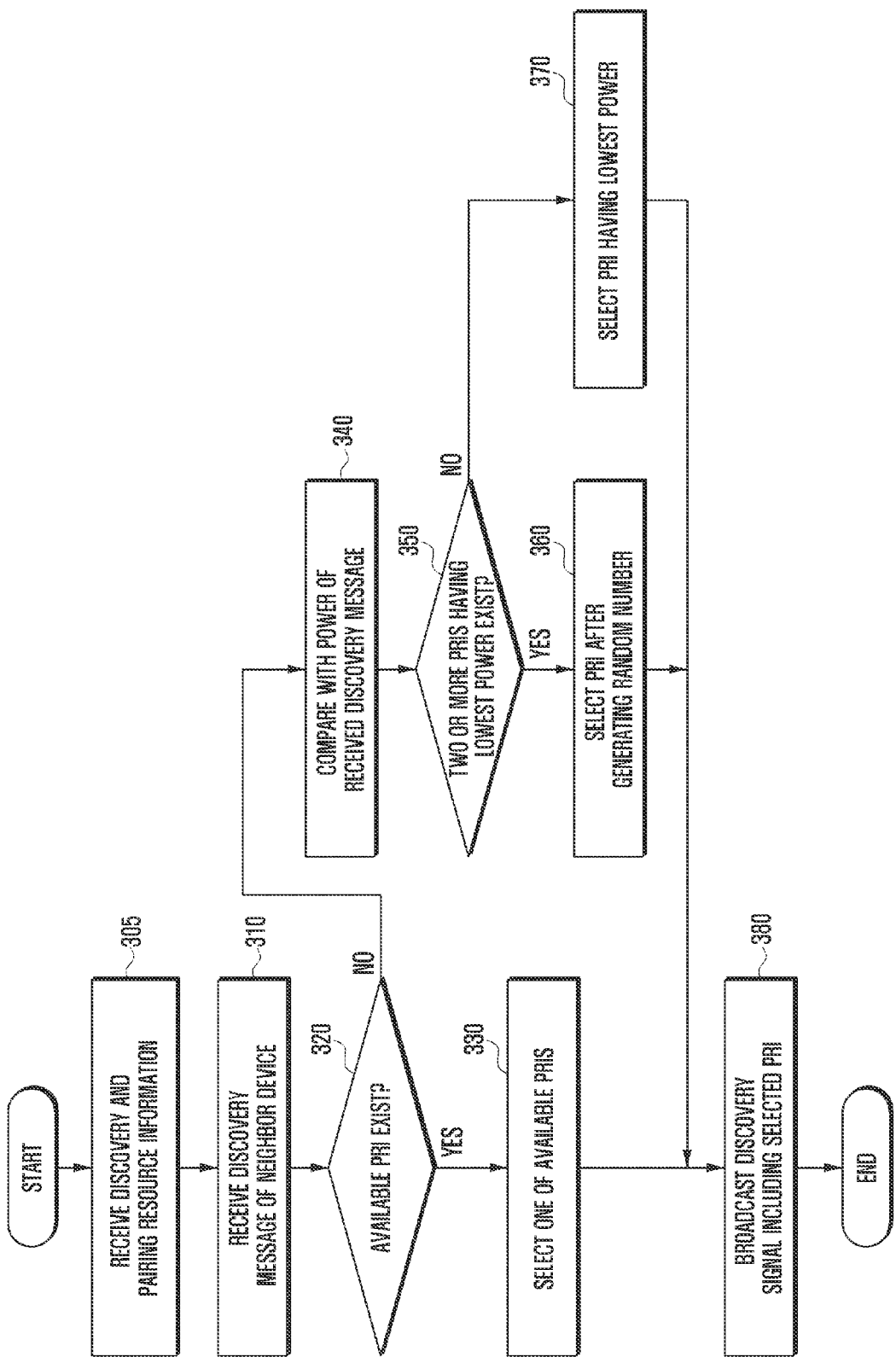
FIG. 3 is a flowchart illustrating a discovery procedure of a device according to an embodiment of the present disclosure.

FIG. 3 is a flowchart illustrating a discovery procedure of a device according to an embodiment of the present disclosure.

Referring to FIG. 3, at operation 305, the device receives discovery and pairing resource information.

According to various embodiments of the present disclosure, the device receives the information for use in search for neighboring devices to prepare D2D communication and requesting for the neighboring devices for communication from the base station. According to various embodiments of the present disclosure, the device may receive the resource information for transmitting at least one of the discovery signal and the pairing signal. According to various embodiments of the present disclosure, the resource information may include indices indicating the resource regions allocated by the base station. According to various embodiments of the present disclosure, the resource information may be transmitted in the System Information Block (SIB) message transmitted from the base station to the device. According to embodiments of the present disclosure, the base station divides a certain radio resource region into plural resource regions and assigns indices to the resource regions and transmits the at least one of resource region information and assigned index to the device. Afterward, the device determines at least one resource index based on the received information and performs at least one of discovery and pairing process based on the determined resource index. According to various embodiments of the present disclosure, the information transmitted by the base station may include at least one of a discovery resource index, pairing resource index, and resource allocation position, resource mapping information, and the like.

According to various embodiments of the present disclosure, operation 305 may be performed optionally. In the case of receiving no such information from the base station, the device may select at least one of the preconfigured resource regions to transmit the discovery signal and pairing signal. In the case of selecting at least one transmission resource among the preconfigured resource regions, transmission of the discovery signal and pairing signal without communication with the base station is possible.

At operation 310, the device receives a discovery message transmitted by a neighbor device. The discovery message may include a PRI used by the neighbor device. The PRI may indicate the frequency band used in D2D communication based on RDM. There may be a predetermined number of PRIs in the frequency band for D2D service. According to various embodiments of the present disclosure, the PRI may include a value indicating the position of the resource in the frequency band used for communicating signals between the device and the base station. The PRI used by the neighbor device may be the PRI for use in receiving a signal in D2D communication. The neighbor device may broadcast the PRI for use in receiving signals in D2D communication. The device may receive the PRI broadcast by the neighbor device.

At operation 320, the device determines whether any PRI available for use in D2D communication exist.

If the device determines that a PRI is available at operation 320, then the device may proceed to operation 330 at which the device selects the. If the device determines that a plurality of PRIs is available at operation 320, then the device may select one of the PRIs randomly based on one of random number generation, Pseudo Noise, and Hash scheme algorithms.

If the device determines that no PRI is available at operation 320, then the device may proceed to operation 340 at which the device compares the received signal powers of the discovery messages with each other. The device may compare the received signal powers of the discovery messages per PRI. According to various embodiments of the present disclosure, the device may select the PRI having the lowest received signal power (e.g., the PRI having the least interference probability among all the PRIs).

At operation 350, the device determines whether a number of PRIs having the lowest received signal power of the discovery message is equal to or greater than 2.

If the device determines that the number of PRIs having the lowest received signal power of the discovery message is equal to or greater than 2 at operation 350, then the device may proceed to operation 360 at which the device selects a PRI after generating a random number. For example, the device generates a random number to select one of the two or more PRIs based thereon. According to various embodiments of the present disclosure, the random number may be generated using one of pseudo noise and hash algorithms.

If the device determines that the number of PRIs having the lowest received signal power is 1 at operation 350, then the device may proceed to operation 370 at which the device selects the very PRI having the lowest received signal power.

Afterward, at operation 380, the device broadcasts the discovery signal including the selected PRI. According to various embodiments of the present disclosure, the discovery signal including the selected PRI is received, the neighbor device may determine the PRI to be used for at least one of discovery and pairing based on at least one of the received signal power and PRI information.

In the above described discovery procedure, the device broadcast the signal including PRI for use in receiving signal such that the neighbor devices transmit the signal for D2D communication based on the PRI information.

Figure 4:
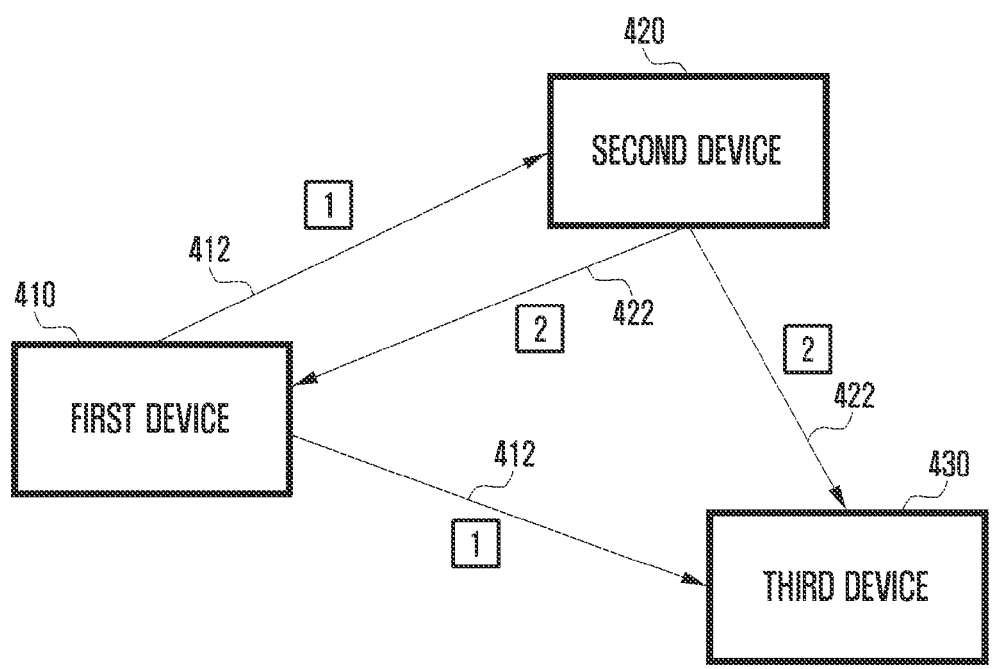
FIG. 4 is a diagram illustrating signal exchange among devices in a discovery procedure according to an embodiment of the present disclosure.

FIG. 4 is a diagram illustrating signal exchange among devices in a discovery procedure according to an embodiment of the present disclosure.

Referring to FIG. 4, first device 410 selects the PRI 1 and broadcasts the discovery message including PRI 1 such that second device 420 and third device 430 receive the discovery message as denoted by reference number 412.

The second device 420 recognizes that the first device 410 uses the PRI 1 based on the discovery message, and selects the PRI 2 and broadcasts a discovery message including the PRI 2 such that the first device 410 and the third device 430 receive the discovery message as denoted by reference number 422.

Likewise, the third device 430 recognizes that the first device 410 and the second device 420 use the PRIs 1 and 2 respectively based on discovery messages received therefrom, and selects one of a remaining PRIs randomly and broadcasts a discovery message including the PRI.

Figure 5:
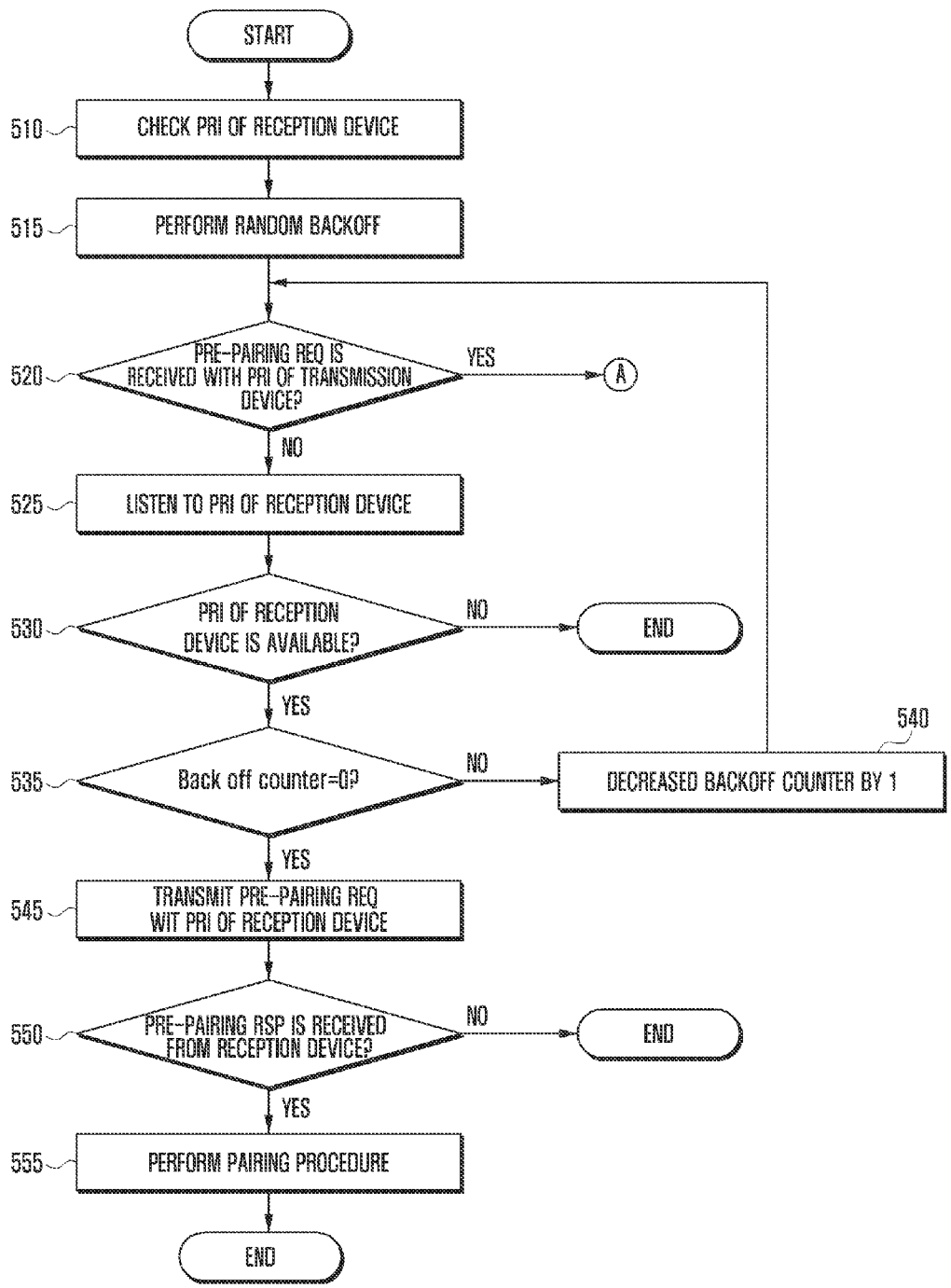
FIG. 5 is a flowchart illustrating a pairing procedure of a transmission device according to an embodiment of the present disclosure.

FIG. 5 is a flowchart illustrating a pairing procedure of a transmission device according to an embodiment of the present disclosure.

At operation 510, the transmission device checks (e.g., determines) PRI of the reception device to perform pairing. The PRI of the reception device may be acquired from the discovery message received in the discovery procedure. The transmission device may transmit the data with the PRI of the reception device.

At operation 515, the transmission device performs random backoff with a predetermined counter. The counter is set to a value of time duration for receiving messages from adjacent devices and may be changed according to the communication environment.

At operation 520, the transmission device determines whether a Pre-Pairing REQ with a PRI of the transmission device is received. The PRI of the transmission device may be the PRI determined by the transmission device determined in the discovery procedure for use in receiving data. The transmission device broadcasts the discovery message including a PRI of the transmission device such that the adjacent devices receive the discovery message and are aware of the PRI of the transmission device. At least one of the adjacent devices may transmit a Pre-Pairing REQ for D2D data communication with the transmission device.

If the transmission device determines that the Pre-Pairing REQ with PRI of the transmission device is received at operation 520, then the procedure goes to operation A. The procedure of operation A and subsequent operations are described with reference to FIG. 6.

If the transmission device determines that no Pre-Pairing REQ with PRI of the transmission device is received at operation 520, then the transmission device proceeds to operation 525 at which the transmission device performs PRI listening to receive Pre-Pairing REQ with PRI of the reception device. According to various embodiments of the present disclosure, if a Pre-Pairing REQ with the PRI of the transmission device is received from another device, the transmission device may perform the pairing procedure with the reception device.

At operation 530, the transmission device determines whether the PRI of the reception device is vacant. For example, the transmission device determines whether the PRI of the reception device is available. If another adjacent device has transmitted Pre-Pairing REQ with the PRI of the reception device already, the PRI of the reception device is not vacant and, otherwise if another adjacent device has not transmitted Pre-Pairing REQ with the PRI of the reception device, the PRI of the reception device is vacant. If the PRI of the reception device is not vacant, this means the reception device performs pairing with another device and thus the transmission device stops the pairing procedure with the transmission device.

If the transmission device determines that the PRI of the reception device is vacant (e.g., available) at operation 530, then the transmission device proceeds to operation 535 at which the transmission device determines whether the backoff counter has expired.

If the transmission device determines that the backoff counter has not expired at operation 535, then the transmission device proceeds to operation 540 at which the transmission device decrements the backoff counter by 1, and thereafter the transmission device returns the procedure to operation 520. According to various embodiments of the present disclosure, the backoff counter may be set to a positive integer value and, by adjusting the backoff counter value, determining the Pre-Pairing REQ message listening duration is possible. The backoff counter may be set differently per device. The time duration for which the transmission device listens to the Pre-Pairing REQ message of adjacent devices may be referred to as transmission duration as a part of the negotiation duration and is described in detail later.

If the transmission device determines that the backoff counter has expired at operation 535, then the transmission device proceeds to operation 545 at which the transmission device transmits the Pre-Pairing REQ with the PRI of the reception device.

At operation 550, the transmission device determines whether a Pre-Pairing RSP is received form the reception device in response to the Pre-Pairing REQ. The transmission device monitors to receive the Pre-Pairing RSP for a predetermined duration. The predetermined duration for which the transmission device monitors to receive the Pre-Paring RSP may be referred to as reception duration as a part of the negotiation duration.

If the transmission device determines that no Pre-Pairing RSP is received from the reception device in the reception duration at operation 550, then the transmission device ends the procedure.

In contrast, if the transmission device determines that the Pre-Pairing RSP is received from the reception device in the reception duration at operation 550, then the transmission device proceeds to operation 555 at which the transmission device performs the pairing procedure. According to various embodiments of the present disclosure, the pairing procedure may be called Full Pairing compared to Pre-Pairing. According to various embodiments of the present disclosure, the reception device may select a CID for D2D communication through the full pairing and then perform data communication with the transmission device based on the selected CID. In the pairing process, the transmission device may receive the information on the reception device which may include Cell-Radio Network Temporary Identifier (C-RNTI) of the reception device.

As described above, the transmission device determines whether the PRI of the reception device is included in the Pre-Pairing REQ transmitted by other neighbor device before transmitting its Pre-Pairing REQ to the reception device so as to avoid pairing collision.

According to various embodiments of the present disclosure, the Pre-Pairing procedure may follow the discovery device and share some time duration with the Full Pairing procedure.

Figure 6:
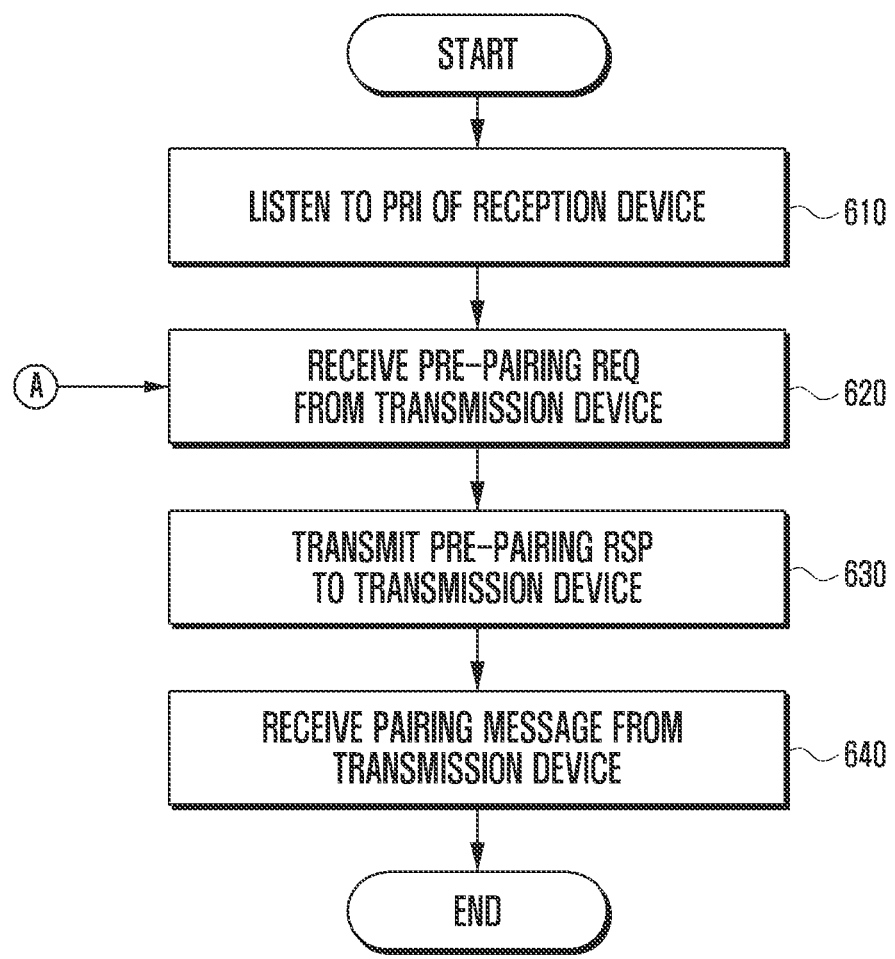
FIG. 6 is a flowchart illustrating a pairing procedure of a reception device according to an embodiment of the present disclosure.

FIG. 6 is a flowchart illustrating a pairing procedure of a reception device according to an embodiment of the present disclosure.

Referring to FIGS. 5 and 6, at operation 610, the reception device is listening to the signal transmitted with a PRI thereof determined in the discovery procedure. The adjacent devices attempting pairing with the reception device may transmit Pre-Pairing REQ with the PRI of the reception device.

At operation 620, the reception device receives the Pre-Pairing REQ with a PRI thereof from the transmission device. The transmission device which has received Pre-Pairing REQ at operation 520 of FIG. 5 may operate as the reception device at operation A.

At operation 630, the reception device transmits the Pre-Pairing RSP to the transmission device in response to the Pre-Pairing REQ.

At operation 640, the reception device receives a Pairing Message initiating Full Pairing from the transmission device.

Figure 7:
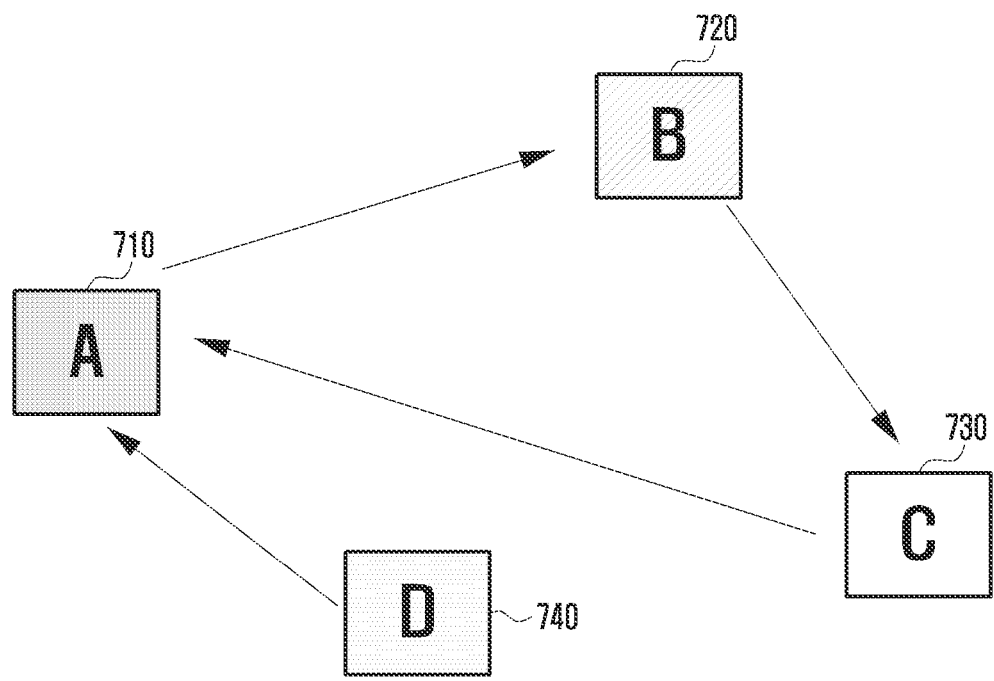
FIG. 7 is a diagram illustrating signal exchanges among devices in a pairing procedure according to an embodiment of the present disclosure.
Figure 8:
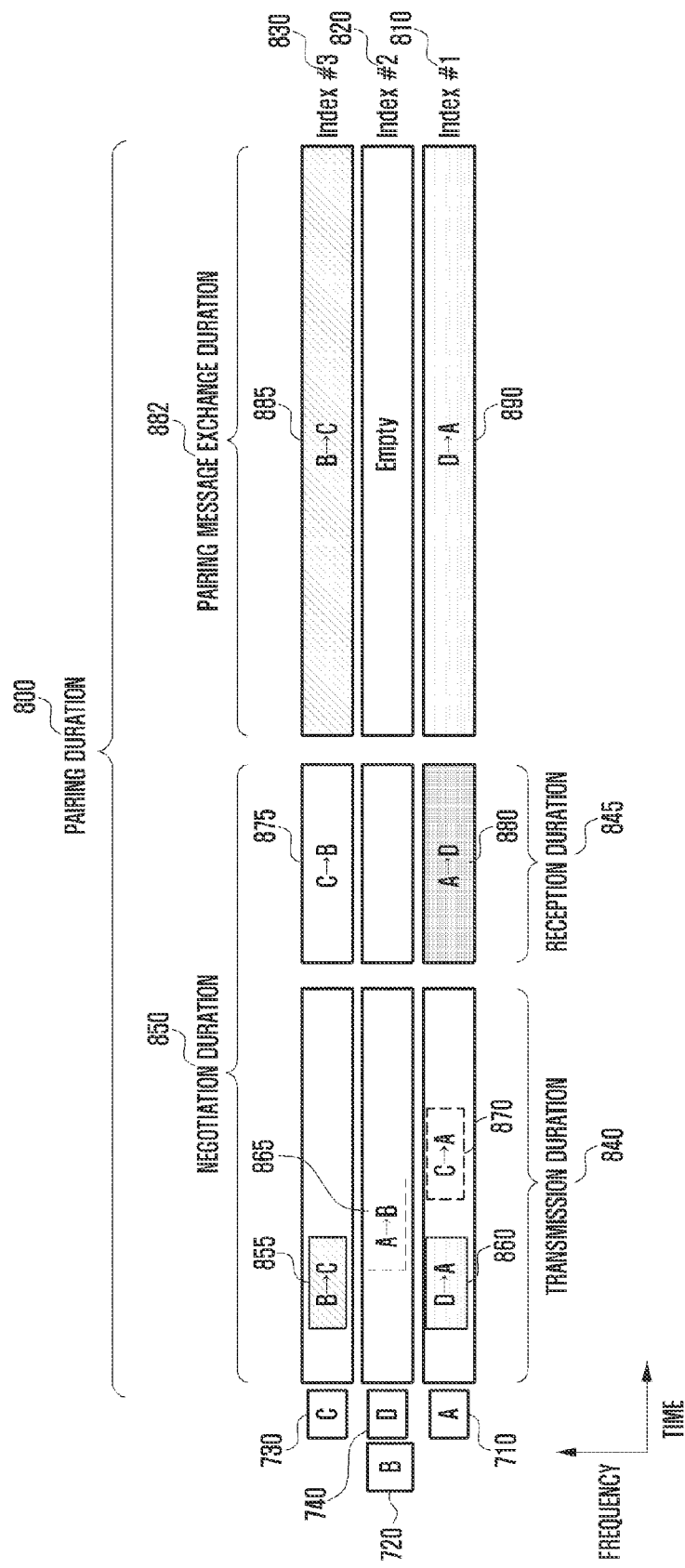
FIG. 8 is a diagram illustrating operation sequences of devices in a pairing procedure according to an embodiment of the present disclosure.

FIGS. 7 and 8 are diagrams illustrating signal exchange among devices in the pairing procedure according to an embodiment of the present disclosure. FIG. 7 is a diagram illustrating signal exchanges among devices in a pairing procedure according to an embodiment of the present disclosure. FIG. 8 is a diagram illustrating operation sequences of devices in a pairing procedure according to an embodiment of the present disclosure.

Referring to FIGS. 7 and 8, the direction communication may be performed among device A 710, device B 720, device C 730, and device D 740. According to various embodiments of the present disclosure, each device may transmit the Pre-Pairing REQ to one of other devices. The Pre-Pairing REQ may include the PRI for use in receiving data.

According to various embodiments of the present disclosure, the frequency band used for pairing may include three PRIs. Each device may broadcast the discovery message including a PRI for used in receiving data in the discovery procedure.

According to various embodiments of the present disclosure, PRIs that can be used for data communication of the devices A to D may include Index#1 810, Index#2 820, and index#3 830. According to various alternative embodiments of the present disclosure, the other PRIs may be included. The device A 710 uses Index#1 810, the device B 720 and device D 740 use Index#2 820, and the device C 730 uses Index#3 830. The indices may be used for D2D communications occupying different frequency bands in FDM system. According to various embodiments of the present disclosure, the device may broadcast the PRI for use in receiving signal in the discovery duration followed by the pairing duration.

The pairing duration 800 includes negotiation duration 850 and pairing message exchange duration 882 on the time axis.

The negotiation duration 850 is the time duration for checking (e.g., determining) the peer for exchanging the pairing messages in D2D communication. According to various embodiments of the present disclosure, the negotiation duration 850 includes transmission duration 840 and reception duration 845. The information transmitted for the transmission duration 850 may include transmission device ID, reception device ID, and PRI for use at the reception device in receiving data.

In the transmission duration 840, the transmission device may transmit the Pre-Pairing REQ to the reception device. The Pre-Pairing REQ includes the transmission device ID, the reception device ID, and the PRI for use at the reception device in receiving data. The transmission device listens to the Pre-Pairing REQ transmitted by other devices with the PRI for use at the reception device in receiving signal. In the case that another device has transmitted the Pre-Pairing REQ to the reception device already, the transmission device gives up transmitting the Pre-Pairing REQ or skips subsequent procedure after transmitting the Pre-Pairing REQ.

In the reception duration 845, the reception device transmits the Pre-Pairing RSP to the transmission device which has transmitted the Pre-Pairing REQ including the PRI for use at the reception device in receiving signal for the transmission duration 840. The Pre-Pairing RSP may include at least one of the reception device ID, the transmission device ID, and the PRI for use in receiving signal at the transmission device.

The transmission device transmits the Pre-Pairing REQ to the reception device in the transmission duration 840, and the reception device transmits the Pre-Pairing RSP to the transmission device in response to the Pre-Pairing REQ in the reception duration 845. After exchanging the Pre-Pairing REQ and Pre-Pairing RSP, the transmission and reception devices may exchange information necessary for pairing in the pairing message exchange duration 882. According to various embodiments of the present disclosure, the pairing message exchange duration may be called Full Pairing duration.

According to various embodiments of the present disclosure, the device B 720 transmits the Pre-Pairing REQ 855 to the device C 730 in the transmission duration 840. The device D 740 transmits the Pre-Pairing REQ 860 to the device A 710 in the transmission duration 840. The device C 730 may listen to the Index#1 810 used by the device 710 in receiving signal in the transmission duration 840. The device D 740 transmits the Pre-Pairing REQ 860 to the device A 710 ahead of the device C 730, the device C may know that the device A 710 has received the Pre-Pairing REQ 860 transmitted by the device D 740 in the listening period. Thus, the device C 730 may end the procedure after transmitting the Pre-Pairing REQ 870 with index 810 or without signal transmission.

Although the device A 710 may transmit the Pre-Pairing REQ 865 with the Index#2 820 to the device B 720, because the device A 710 has received the Pre-Pairing REQ 860 from the device D740 with the index#1 810 before transmitting the Pre-Pairing REQ 865, the device A 710 operates as the reception device. Accordingly, the device A 710 may ends the procedure in the transmission duration 840 without transmitting the Pre-Pairing REQ 865 or after transmitting the Pre-Pairing REQ 865 to the device B 720 using index#2 820.

Because the device A 710 receives the Pre-Pairing REQ 860 with the index#1 810 from the device D740 first in the transmission duration 840, the device A 710 transmits the Pre-Pairing RSP 880 to the device D 740 in the reception duration 845.

Because the device B 720 transmits the Pre-Pairing REQ 855 to the device C 730 before receiving the Pre-Pairing REQ transmitted by other devices in the transmission duration, the device B 720 operates as the transmission device in the negotiation duration 850. Accordingly, the device B 720 receives the Pre-Pairing RSP 875 transmitted by the device C 730 in the reception duration 845.

Because the device C 730 receives the Pre-Pairing REQ 855 transmitted by the device B 720 with index#3 830 in the transmission duration 840, the device C 730 operates as the reception device in the reception duration 845. Accordingly, the device C 730 may transmit the Pre-Pairing RSP 875 in the reception duration 845.

The device D 740 transmits the Pre-Pairing REQ 860 to the device A 710 in the transmission duration 840. Thus the device D 740 may receive the Pre-Pairing RSP 880 transmitted by the device A 710 in the reception duration 845.

A pair of device B 720 and device C 730 and a pair of device A 710 and device D 740 complete the Pre-Pairing procedure respectively in the negotiation duration 850.

According to various embodiments of the present disclosure, in the pairing message exchange duration 882, the devices pre-paired in the negotiation duration 850 exchange pairing messages. According to various embodiments of the present disclosure, the device B 720 and the device C 730 may exchange the pairing message 885 in the pairing message exchange duration 882. Likewise, the device A 710 and the device D 740 may exchange the pairing message 890 in the pairing message exchange duration 882.

According to various embodiments of the present disclosure, the devices exchanged the pairing message 890 may communicate data using the corresponding PRI.

According to various embodiments of the present disclosure, the devices may communicate data in the data transmission duration following the pairing duration using the same PRI as the pairing duration.

Figure 9:
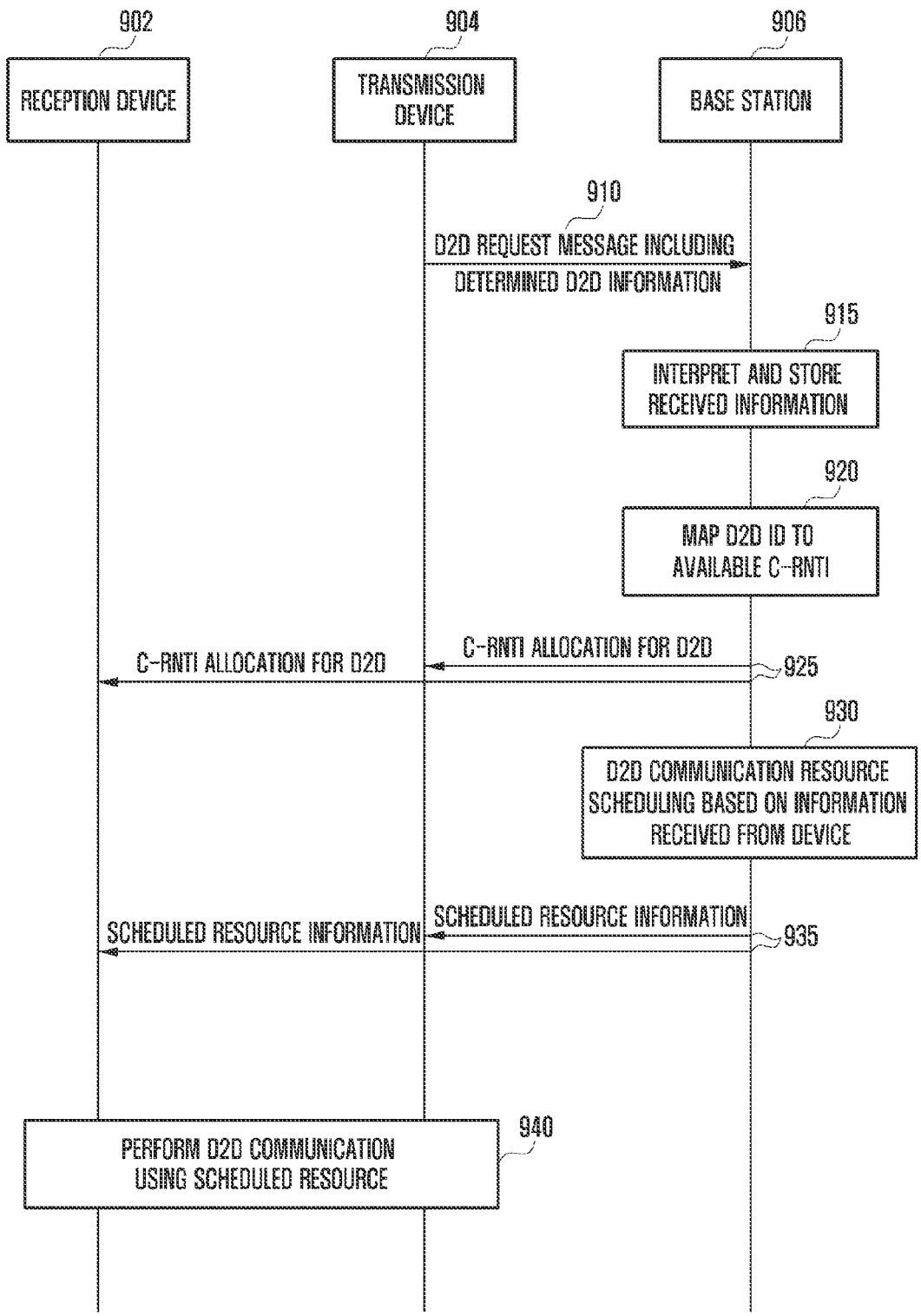
FIG. 9 is a signal flow diagram illustrating signal flows between a device and a base station for D2D communication according to an embodiment of the present disclosure.

FIG. 9 is a signal flow diagram illustrating signal flows between a device and a base station for D2D communication according to an embodiment of the present disclosure.

According to various embodiments of the present disclosure, the reception device 902 and the transmission device 904 have acquired CID for D2D Communication (D_CID) already through the discovery and pairing procedures. According to various embodiments of the present disclosure, the discovery procedure may be performed as described with reference to FIG. 4, and the pairing procedure may be performed as described with FIGS. 5 and 6.

At operation 910, the transmission device 904 sends the base station 906 a D2D request message for D2D communication. According to various embodiments of the present disclosure, the D2D communication may include the procedure of communicating data between the paired transmission device 904 and reception device 902. According to various embodiments of the present disclosure, the D2D request message may include at least one of D_CID determined through the discovery and pairing procedures, transmission device information, reception device information, buffer size, and PRI index. According to various embodiments of the present disclosure, the transmission device 904 may be in the RRC Connected state and has the C-RNTI valid for use in communicating signals with the base station 906 within the cell formed by the base station 906.

At operation 915, the base station 906 may interpret the information received at operation 910 and store the interpretation result. Once the information has been interpreted, the base station 906 acquires the information on the reception device 902 and the transmission device 904. The base station 906 also may predict that the reception device 902 and transmission device 904 are paired and perform resource allocation procedure for data communication.

At operation 920, the base station 906 may allocate D2D Radio Network Temporary Identifier (RNTI) to the reception and transmission devices 902 and 904 for D2D communication. According to various embodiments of the present disclosure, the D2D RNTI is selected among C_RNTIs managed by the base station 906, and the base station 906 may store the D2D RNTI mapped to CID. By mapping the CID to the D2D RNTI, it is possible for the base station 906 to allocate the D2D RNTIs for multiple D2D communication sessions without overlap. According to various embodiments of the present disclosure, the D2D RNTI may include the C-RNTI allocated by the base station 906 to the reception and transmission devices 902 and 904 for D2D data communication.

At operation 925, the base station 906 transmits the D2D RNTI allocated at operation 920 to the reception device 902 and transmission device 904. In this way, the reception device 902 and transmission device 904 may be scheduled so as to secure the resource for data communication. According to various embodiments of the present disclosure, if the device to be assigned D2D RNTI operates in RRC_Idle Mode, the base station, broadcast the D2D RNTI with the received CID, and the device in the RRC_Idle Mode interprets the message corresponding to its CID in the broadcast message to acquire the D2D RNTI. According to an embodiment, the D2D RNTI received by the transmission device 904 may be sent to the reception device 902.

At operation 930, the base station 906 performs resource scheduling for data communication between the reception device 902 and transmission device 904. According to various embodiments of the present disclosure, the base station 906 may perform resource allocation based on at least one of the CID of the reception device 902 and transmission device 904 and the PRI used in pairing. The allocated resource may include at least one of uplink and downlink resources.

At operation 935, the base station 906 transmits the information on the resource scheduled at operation 930 to the reception and transmission devices 902 and 904. According to various embodiments of the present disclosure, the scheduled resource information may be transmitted to the respective devices through control channels. According to various embodiments of the present disclosure, the reception device 902 and transmission device 904 may acquire the scheduled resource information along with the D2D RNTI allocated at operation 925.

At operation 940, the reception and transmission devices 902 and 904 may perform D2D communication based on scheduled resource information. In more detail, each device checks (e.g., determines) the position of the resource for use in D2D communication based on the resource information and performs D2D communication on the checked (e.g., determined) resource position, and the D2D communication may include data communication between the reception device 902 and transmission device 904.

According to various embodiments of the present disclosure, each of the devices and base station may include a transceiver for transmitting and receiving signals to and from other entity and a control unit for controlling the transceiver and operations of the devices or the base station based on the data transmitted and received through the transceiver.

The information exchange method and apparatus for D2D communication according to the present disclosure is capable of preventing a plurality of devices from attempting pairing on the same frequency simultaneously, thereby improving pairing efficiency and reducing power consumption of the device.

In addition, the information exchange method and apparatus for D2D communication according to the present disclosure is capable of broadcasting information on the resource allocated to the device for data transmission, thereby decreasing communication error probability caused by resource overlap between devices and allocating resource fairly.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A signal transmission/reception method of a device in a mobile communication system, the method comprising:

transmitting, by the device, a device to device (D2D) request signal to a base station, wherein the D2D request signal includes at least one of device information, paired neighbor device information, pairing connection information, pairing resource information, and device buffer size;

receiving, by the device, information associated with a discovery signal and information associated with a pairing signal from the base station, wherein the information associated with the discovery signal and the information associated with the pairing signal includes an identification of a resource region to use when transmitting or receiving the discovery signal and the pairing signal based on the D2D request;

determining, by the device, a resource to receive the pairing signal for the device;

transmitting, by the device, the discovery signal including information related to the determined resource to receive the pairing signal for the device within a first period;

receiving, by the device, from a neighbor device that received the discovery signal, the pairing signal within a second period using a resource determined based on the information related to the determined resource to receive the pairing signal for the device; and communicating a data signal with the paired neighbor device during a third period, wherein the resource for transmitting the pairing signal for the device is selected based on at least one signal received by the neighbor device during the first period.

2. The method of claim 1, wherein the determining of the resource to receive the pairing signal comprises:
receiving at least one of information on a resource for transmission/reception of the discovery signal and information on a resource for transmission/reception of the pairing signal from the base station; and
determining one of the resource for transmission/reception as the resource for receiving the pairing signal.

3. The method of claim 2, wherein the receiving of at least one of information on the resource for transmission/reception of the discovery signal and information on the resource for transmission/reception of the pairing signal comprises:
receiving the information including indices indicating positions of the resource corresponding to the discovery signal transmission/reception resource and the pairing signal transmission/reception resource.

4. The method of claim 2, wherein the at least one of information on the resource for transmission/reception of the discovery signal and information on the resource for transmission/reception of the pairing signal is received through a System Information Block (SIB) signal.

5. The method of claim 1, wherein the determining of the resource to receive the pairing signal for the device comprises:
receiving at least one discovery signal transmitted by the neighbor device, the discovery signal including information on a resource for use in pairing for the neighbor device; and
determining the resource to receive the pairing signal for the device based on the information on the resource for use in pairing for the neighbor device.

6. The method of claim 1, further comprising:
receiving a D2D communication identifier allocated based on at least one of information included in the D2D request signal from the base station; and
communicating the data signal with the neighbor device based on the D2D communication identifier.

7. The method of claim 6, wherein the communicating of the data signal comprises:
receiving data communication resource allocation information corresponding to the D2D communication identifier from the base station;
determining a resource for use in data communication based on the data communication resource allocation information and the D2D communication identifier; and
communicating the data signal with the neighbor device through the resource determined for use in data communication.

8. The method of claim 1, wherein the pairing with the neighbor device comprises:
transmitting a first pairing request message to the neighbor device through the determined resource;
receiving a first pairing response message from the neighbor device in response to the first pairing request message; and
performing, if the first pairing response message is received, the pairing with the neighbor device.

9. A device operating in a mobile communication system, the device comprising:
at least one processor configured to:
transmit a device to device (D2D) request signal to a base station, wherein the D2D request includes at least one of device information, paired neighbor device information, pairing connection information, pairing resource information, and device buffer size,
receive information associated with a discovery signal and information associated with a pairing signal from the base station, wherein the information associated with the discovery signal and the information associated with the pairing signal includes an identification of a resource region to use when transmitting or receiving the discovery signal and the pairing signal based on the D2D request,
determine a resource to receive the pairing signal for the device,
transmit the discovery signal including information related to the determined resource to receive the pairing signal within a first period,
receive, from a neighbor device that received the discovery signal, the pairing signal within a second period using a resource determined based on the information related to the determined resource to receive the pairing signal for the device, and
control the device to communicate a data signal with the paired neighbor device during a third period,
wherein the resource for transmitting the pairing signal for the device is selected based on at least one signal received by the neighbor device during the first period.

10. The device of claim 9, wherein the at least one processor is further configured to:
control the device to receive at least one of information on a resource for transmission/reception of the discovery signal and information on a resource for transmission/reception of the pairing signal from the base station, and
determine one of the resource for transmission/reception as the resource for receiving the pairing signal.

11. The device of claim 10, wherein the at least one processor is further configured to control the device to receive the information including indices indicating positions of the resource corresponding to the discovery signal transmission/reception resource and the pairing signal transmission/reception resource.

12. The device of claim 10, wherein the at least one of information on the resource for transmission/reception of the discovery signal and information on the resource for transmission/reception of the pairing signal is received through a System Information Block (SIB) signal.

13. The device of claim 9, wherein the at least one processor is further configured to:
control the device to receive at least one discovery signal transmitted by the neighbor device, the discovery signal including information on a resource for use in pairing for the neighbor device, and
determine the resource to receive the pairing signal based on the information on the resource for use in pairing for the neighbor device.

14. The device of claim 9, wherein the at least one processor is further configured to:
receive a D2D communication identifier allocated based on information included in the D2D request signal from the base station, and
communicate the data signals with the neighbor device based on the D2D communication identifier.

15. The device of claim 14, wherein the at least one processor is further configured to:
control the device to receive data communication resource allocation information corresponding to the D2D communication identifier from the base station, determine resource for use in data communication based on the data communication resource allocation information and the D2D communication identifier, and communicate the data signal with the neighbor device through the resource determined for use in data communication.

16. The device of claim 9, wherein the at least one processor is further configured to:

control the device to transmit a first pairing request message to the neighbor device through the determined resource, receive a first pairing response message from the neighbor device in response to the first pairing request message, and perform, if the first pairing response message is received, the pairing with the neighbor device.

17. A signal transmission/reception method of a base station in a mobile communication system, the method comprising:

receiving, by the base station, a device to device (D2D) request signal from a device, wherein the D2D request includes at least one of device information, paired neighbor device information, pairing connection information, pairing resource information, and device buffer size; and transmitting, from the base station to the device, information associated with a discovery signal and information associated with a pairing signal, wherein the information associated with the discovery signal and the information associated with the pairing signal includes an identification of a resource region to use when transmitting or receiving the discovery signal and the pairing signal based on the D2D request, wherein the device is configured to:

determine a resource to receive a pairing signal for the device based on the information associated with the pairing signal, transmit the discovery signal including information related to the determined resource to receive the pairing signal for the device within a first period using the information associated with the discovery signal, and receive the pairing signal for the device from a neighbor device that received the discovery signal, the pairing signal for the device received within a second period using a resource determined based on the information related to the determined resource to receive the pairing signal for the device, and wherein the resource for transmitting the pairing signal for e device is selected based on at least one signal received by the neighbor device during the first period.

18. The method of claim 17, further comprising:

transmitting, by the base station to the device, a D2D communication identifier allocated based on the identified resource region.

19. A base station of a mobile communication system, the base station comprising:

at least one processor configured to:

receive, from the device, a device to device (D2D) request signal, wherein the D2D request includes at least one of device information, paired neighbor device information, pairing connection information, pairing resource information, and device buffer size; and transmit to the device information associated with a discovery signal and information associated with a pairing signal, wherein the information associated with the discovery signal and the information associated with the pairing signal includes an identification of a resource region to use when transmitting or receiving the discovery signal and the pairing signal based on the D2D request, wherein the device is configured to:

determine a resource to receive a pairing signal for the device based on the information associated with the pairing signal, transmit the discovery signal including information related to the determined resource to receive the pairing signal for the device within a first period using the information associated with the discovery signal, and receive the pairing signal for the device from a neighbor device that received the discovery signal, the pairing signal for the device received within a second period using a resource determined based on the information related to the determined resource to receive the pairing signal for the device, and wherein the resource for transmitting the pairing signal for e device is selected based on at least one signal received by the neighbor device during the first period.

20. The base station of claim 19, wherein the at least one processor is further configured to transmit a D2D communication identifier allocated based on the identified resource region.

* * * * *